United States Patent Office 3,512,995
Patented May 19, 1970

3,512,995
METHODS FOR MAKING INSTANT FUDGE CANDY
Charles M. D. Reed, Rowayton, and Harry Velander, Norwalk, Conn., assignors to The Taylor-Reed Corporation, Glenbrook, Conn., a corporation of Connecticut
No Drawing. Filed Aug. 5, 1966, Ser. No. 570,399
Int. Cl. A23g 3/00
U.S. Cl. 99—134                                        7 Claims

ABSTRACT OF THE DISCLOSURE

Compositions of dry ingredients to be mixed with water to form a self-solidified "instant" fudge-type candy without requiring heating above room temperature, and processes for formulating these compositions. Mixtures of powdered sugar, finely divided shortening, cocoa or vanilla flavoring and a solidifying agent comprising about 1.5 to 10.0 percent by weight of the mixture are prepared, to be mixed with small amounts of water and blended, producing solidified fudge-type candy without heating or cooking.

---

This invention relates to compositions of matter formed primarily as mixtures of powdered ingredients for making instant candy products, and particularly to such mixtures of powdered ingredients which may be converted easily by the housewife into "instant" fudge-type candy with minimum effort and no cooking whatever.

Prior art

Since the advent of frozen foods, "convenience" food products have become increasingly popular with the consuming public, and numerous "mixes" and "instant" products have been developed and introduced. Instant cake mixes, instant frosting mixes and instant pudding mixes have become increasingly popular since they generally require no measuring or careful blending of separate ingredients; instead, all or most of the ingredients are premixed by the food packager, and generally the housewife merely adds water and then bakes or heats such products in order to prepare them for consumption. Some "instant" products require no cooking, particularly instant puddings, which are conventionally mixed with water and allowed to stand, sometimes in the refrigerator, until they are gelled and ready to serve, although such uncooked puddings are often criticized for their "metallic" or "chemical" flavors when consumed.

Fudge and many other types of candy have traditionally required highly complex cooking procedures. The characteristics of sugar solutions during and after the time they are heated to predetermined temperatures and then cooled to room temperature have been employed to determine the softness, tackiness, hardness or brittleness of the resulting candy. To produce candy of the desired stiffness and tackiness, slow heating to a carefully predetermined temperature has been required. This has been achieved by careful temperature measurement by cooking thermometers, or by empirical tests repeated many times over by the cook. One such empirical test involved the familiar task of dropping a droplet of the candy solution taken from the cooking pot into cold water repeatedly, time after time, and then testing the cooled droplet with the fingers to determine when the desired degree of tackiness or stiffness had been reached. Such lengthy, empirical, "soft-ball" tests have required the candy-chef's constant attention for long periods of time in order to produce satisfactory candy, and these lengthy procedures are directly contrary to the approach typified by such convenience food products as "instant" mixes.

The "Instant Fudge" dry mixes of this invention

For many years, there has been an unfilled need for a successful "instant fudge" mix—a mixture of powdered or granular ingredients which may be mixed or creamed with water and spread in a pan to produce fudge-type candy without complex and time-consuming cooking procedures.

This object has been achieved by the mixtures of this invention, which produce an uncooked candy similar in texture and flavor to old-fashioned cooked fudge. It is easily and conveniently severed along a smooth cleavage plane without adhering to the knife. It holds its shape firmly for convenient storage and handling, while presenting a soft, palatable and appetizing texture when consumed. The exposed severed cleavage face does not sag or creep and does not become noticeably dry, granular or brittle.

Most important, the powdered mixtures here described achieve the principal object of this invention, for they may be converted to fudge-type candy in the home kitchen by the housewife with great convenience, employing a minimum number of additional ingredients and handling steps, and requiring no cooking whatever.

Other and more specific objects will be apparent from the features, elements, combinations and operating procedures disclosed in the following detailed description.

It has now been found that the foregoing and related objects can be readily attained by mixing together in substantially dry form finely powdered sugars, shortening and flavoring ingredients together with a solidifying agent selected from the group consisting of guar gum, edible pregelatinized vegetable starches and mixtures thereof. The solidifying agent is added in the amount of 1.5 to 10.0 percent by weight of the composition and produces a dry powder mixture which may then be blended with water to form a self-solidifying composition which results in a smoothly severable, non-creeping fudge-type candy.

Solidifying agents

As indicated, the present invention requires the presence of a relatively small amount of a solidifying agent selected from the group consisting of guar gum, pregelatinized vegetable starches and mixtures thereof. Of these solidifying agent, it has been found that pregelatinized vegetable starches give superior results, and accordingly such compounds are preferred as the sole or major component of the solidifying agent.

Exemplary of the pregelatinized vegetable starches which may be employed in accordance with the present invention are corn starch, potato starch, tapioca starch, and wheat starch. Of the several starches, tapioca starch has been found to be preferable because of its excellent solidifying action over a range of concentrations to produce mixtures which blend and spread well and which form fudges of satisfactory cleavability and taste. However, the other pregelatinized vegetable starches may also be employed in various concentrations to produce satisfactory products. Indicative of the comparable properties of mixtures utilizing the starches is the data set forth in Table I wherein the pregelatinized starches were provided in the mixtures in various weight percentages and then blended with water and spread into a fudge which was hardened under refrigeration for thirty minutes.

TABLE I.—COMPARISON OF PREGELATINIZED VEGETABLE STARCHES

| Starch | 2.0% by weight | 4.0% by weight | 6.0% by weight | 10.0% by weight |
|---|---|---|---|---|
| Corn: | | | | |
| As blended | Easy to mix and spread | Easy to mix and spread | Stiff; ½ tsp. additional water req'd for mixing. | Stiff and dry; 1½ tsp. add'l water req'd for mixing. Balled up; hard to spread due to cohesiveness. |
| After 30 min. refrig | Not too firm; can be cut; softer than desirable. | Not too firm; can be cut; sticks to pan. | Can be cut; chewy and tough. | Chewy and tough. |
| Potato: | | | | |
| As blended | Easy to mix and spread | Easy to mix and spread | Easy to mix and spread | Dry; requires ½ tsp. add'l water for mixing. |
| After 30 min. refrig | Not firm; remains softer than desirable. | Not firm; remains softer than desirable. | Can be cut; flavor off | Can be cut; flavor off. Chewy and tough. |
| Wheat: | | | | |
| As blended | Easy to mix and spread; soft and sticks to pan. | Easy to mix and spread; sticks to pan. | Req. 1 tsp. add'l water; spreads easily. | Req. 1½ add'l tsp. water; pasty, spreads easily. |
| After 30 min. refrig | Cuts satisfactorily; breaks easily and is soft. | Cuts satisfactorily; breaks easily and is soft. | Cuts satisfactorily and is soft. | Firm, pasty with no breakaway in mouth. |
| Tapioca: | | | | |
| As blended | Easy to mix; does not stick to pan. | Easy to mix; does not stick to pan. | Easy to mix; does not stick to pan. | Stiff and Dry. |
| After 30 min. refrig | Soft | Good cleavage | Good cleavage and chewy | Chewy. |

As can be seen from the preceding table, the pregelatinized tapioca starch produces the best solidifying action, although the other pregelatinized vegetable starches effect the desired solidifying action. Preferably, the pregelatinized tapioca starch is added in an amount between 2.5 and 10.0 percent by weight of the total admixture. Most desirably, the tapioca starch is added in the amount of 4.0 to 8.0 percent by weight with the optimum weight percentage for compositions containing cocoa as the principal flavoring ingredient being about 6.0 percent by weight. When the principal flavoring ingredient is a non-chocolate, such as brown sugar and vanilla flavoring for producing vanilla fudge, the optimum weight percentage is about 7.0 percent.

The preferred tapioca starch may also be used in combination with other pregelatinized vegetable starches or guar gum if so desired. As a substitute for the preferred tapico starch, pregelatinized corn starch when added in an amount of about 3.5 to 4.5 percent by weight of the total admixture forms a composition which is easy to spread and which will solidify after thirty minutes' refrigeration to provide a fudge-type candy exhibiting satisfactory and palatable firmness and texture. The other pregelatinized vegetable starches may also be employed at weight percentages varying within the range of about 2.0 to 10.0 percent for optimum results therewith.

Although various gums have been previously employed in food products for purposes of stiffening the composition, only guar gum has been found satisfactory for the compositions of the present invention. It has been found that guar gum should be utilized within the range of 1.5 to 4.0 percent so as to avoid any tendency of the composition to become dry, and the optimum formulations utilize about 2.0 to 3.5 percent by weight of guar gum. Indicative of the superiority of guar gum over various other gums is the data set forth in Table II wherein instant fudge compositions of the type of the present invention were prepared using 2.0 and 4.0 percent by weight of the several gums tested. The condition of the mix immediately after blending was observed, and the condition of a layer of fudge prepared from the mix was observed at the end of thirty minutes' refrigeration.

TABLE II.—COMPARISON OF NATURAL GUMS

| Gum | 2.0 percent by weight of gum | 4.0 percent by weight of gum |
|---|---|---|
| Guar: | | |
| After mixing with water | Mix was stiff and dry | Mix was stiff. Required addition of ¼ tsp. water to obtain adequate spreadability. Somewhat lighter in color than at 2%. |
| After 30 minutes' refrigeration | Cuts well; fair breakaway in mouth | Cuts well; no breakaway in mouth. |
| Tragacanth: | | |
| After mixing with water | Mix is dry and stiff; requires ½ tsp. more water to obtain appreciable spreadability. Does not spread well and pulls away from sides of pan. | Mix is stiff and gummy; requires 1 tsp. additional water. Is difficult to spread and comes off sides of pan. |
| After 30 minutes' refrigeration | Fudge is chewy and has poor flavor | Fudge is chewy and gummy. |
| Karaya: | | |
| After mixing with water | Mix is stiff and requires 1 tsp. add'l water. Balls up and pulls away from sides of pan. | Mix is stiff and cohesive. Req. 1½ tsp. add'l water. Behaves like dough and could not be spread. |
| After 30 minutes' refrigeration | Chewy like gum; no breakaway in mouth | Chewy like gum. |
| Arabic: | | |
| After mixing with water | Easy to mix and spread; no extra water req'd | Easy to mix and spread. |
| After 30 minutes' refrigeration | Too soft to cut | Too soft to cut. |

As can be seen, gum tragacanth produces mixtures which are too stiff to be spread properly and which exhibit elastic, rubbery properties tending to draw the clump of fudge together and away from the sides of the pan. Karaya gum produces a mixture with similar properties, while gum arabic produces a mixture that is easy to blend and spread but which fails to solidify to the necessary degree, making the resulting fudge too difficult to cut. In addition, karob or locust bean gum has been found to produce a stiff dough-like mass which cannot be spread satisfactorily. Thus, of the several gums, guar gum is the only one found suitable as a solidifying agent.

The general composition

Generally, the amount of the several components within the composition may vary over a fairly wide range depending upon the specific nature of the fudge-type candy being prepared, the particular components being employed (i.e., degree of fineness, water content, etc.) and the amount of pregelatinized starch to be added. However, sugars will generally constitute at least the bulk of the composition and will normally fall within the range of about 70.0 to 85.0 percent by weight of the admixture. The principal sugar employed will be a finely pulverized sugar such as powdered confectioners sugar milled to a 65 to 150 Tyler mesh particle size range. Generally, such sugars are sold in the industry bearing the designations of "6X" and "10X," the 6X designation referring to a sugar wherein less than 1.0 percent will be retained by a 65 mesh Tyler screen, and the designation 10X referring to a sugar wherein less than 0.5 percent will be retained on a 100 mesh Tyler screen. However, it is common to employ confectioners sugars in combination with finely pulverized dextrose or corn sugar milled to the 65 to 150 Tyler mesh particle size range. As is well known in the art, various sugars may be employed in the manufacture of fudges, most of which will be generically classed as sucrose to dextrose.

The edible flavoring ingredients which are added to determine the flavor and at times the color of the fudge-type candy may vary from as little as 0.2 percent by weight to as much as 15.0 percent by weight and even more. Powdered dry flavorings such as cocoa to produce chocolate fudge, cocoa and mint for chocolate-mint fudge, vanilla flavoring for vanilla fudge and other flavorings to produce strawberry, butterscotch or penuche fudge may be employed. Oftentimes, the use of particular sugars may combine with the flavoring extracts such as, for example, brown sugar or maple sugar. The operation of the flavoring ingredients may be enhanced by the addition of other components such as nut meats (walnuts, pecans, etc.) to provide a further filler component and contribute to the flavor and texture of the resultant candy product.

The last component is shortening which can be derived from any edible vegetable or animal fat. The shortening content may vary from about 1.0 to 15.0 percent of the admixture depending upon the taste and creaminess desired, as well as the specific shortening selected.

In addition to the foregoing components, the last essential component is the solidifying agent which has been discussed hereinbefore in detail. Other, non-essential components may be added, such as salt, milk solids, vegetable coloring materials and processing aids such as dry, uncooked corn starch for anticaking properties. Nut meats which have been discussed above from the standpoint of flavoring are more properly considered a supplemental additive since they are not a true flavoring ingredient in the normal sense. Thus, the dry powder mixture will generally have the following composition:

| Ingredient: | Range of weight percentages |
|---|---|
| Powdered sugars | 70.0 to 85.0 |
| Finely divided shortening | 1.0 to 15.0 |
| Flavoring ingredients | 0.2 to 14.0 |
| Solidifying agent | 1.5 to 10.0 |

Exemplary of suitable formulations for mixing powdered ingredients to form instant fudge mixes in commercial size batches nominally of 1250 pounds total weight are the specific compositions set forth in Tables III, IV and V hereinafter. The composition in Table III is one utilized to prepare an instant fudge mix having a true chocolate fudge flavor. The composition in Table IV produces a chocolate-mint flavor, and the composition in Table V produces a vanilla fudge flavor.

TABLE III.—INSTANT CHOCOLATE FUDGE FORMULATION

| Ingredients | Pounds | Percent by wt. |
|---|---|---|
| Dextrose, pulverized | 510.0 | 40.786 |
| Cane sugar, 6X | 450.0 | 35.987 |
| Cocoa, natural | 90.0 | 7.197 |
| Cocoa, dutch | 38.0 | 3.039 |
| Shortening | 60.0 | 4.798 |
| Mono- and diglyceride emulsifying agents (Drewmulse) | 3.2 | 0.256 |
| Pregelatinized tapioca starch | 60.0 | 4.798 |
| Corn starch | 26.0 | 2.079 |
| Non-fat milk solids | 9.0 | 0.720 |
| Salt | 3.5 | 0.280 |
| Vanilla flavoring ("Vanasyn M" Ritter Co.) | 0.8 | 0.060 |
|  | 1,250.5 | 100.000 |

TABLE IV.—INSTANT CHOCOLATE-MINT FUDGE FORMULATION

| Ingredients | Pounds | Percent by wt. |
|---|---|---|
| Dextrose, pulverized | 510.0 | 40.758 |
| Cane sugar, 6X | 450.0 | 35.963 |
| Cocoa, natural | 90.0 | 7.192 |
| Cocoa, Dutch | 38.0 | 3.037 |
| Shortening | 60.0 | 4.795 |
| Mono- and diglyceride emulsifying agents (Drewmulse) | 3.2 | 0.256 |
| Pregelatinized tapioca starch | 60.0 | 4.795 |
| Corn starch | 26.0 | 2.078 |
| Non-fat milk solids | 9.0 | 0.719 |
| Salt | 3.5 | 0.280 |
| Vanilla flavoring ("Vanasyn M," Ritter Co.) | 0.75 | 0.060 |
| Mint flavoring | 0.84 | 0.067 |
|  | 1,251.3 | 100.000 |

TABLE V.—INSTANT VANILLA FUDGE FORMULATION

| Ingredients | Pounds | Percent by wt. |
|---|---|---|
| Dextrose, pulverized | 627.0 | 50.018 |
| Cane sugar, 6X | 342.5 | 27.323 |
| Shortening | 35.0 | 2.792 |
| Mono- and diglyceride emulsifying agents (Drewmulse) | 2.0 | 0.160 |
| Pregelatinized tapioca starch | 75.0 | 5.983 |
| Non-fat milk solids | 11.0 | 0.878 |
| Salt | 6.0 | 0.479 |
| Brown sugar | 89.0 | 7.100 |
| Caramel color, NACCO Caramel Shade 2 | 0.2 | 0.017 |
| Pure vanilla flavoring | 3.4 | 0.271 |
| Vanilla flavoring 3838 | 1.7 | 0.136 |
| Vanilla flavoring 2795 | 1.7 | 0.136 |
| Uncooked wheat starch | 59.0 | 4.707 |
|  | 1253.5 | 100.000 |

In preparing the mixes of the present invention, the preferred procedure is to first form a premix of the shortening and some or all of the flavoring and coloring ingredients such as cocoa, vanilla and Kohnstamm yellow colors. These components are creamed for a period of at least five minutes in a blending step often referred to as "creaming" so as to thoroughly mix and distribute the flavoring and coloring ingredients throughout the shortening and thereby avoid any heterogeneity in the final product. About one-half of the sugar and other dry ingredients are placed in a standard commercial blender, preferably a ribbon blender of the type having oppositely pitched helical blades, and the creamed shortening premix is added thereto. This addition is followed by the remainder of the sugar and dry ingredients. Then the entire mass is thoroughly admixed by operation of the ribbon blender at moderate speeds so as to toss and tumble the ingredients and produce a smoothly blended, substantially dry granular product in which the shortening surrounds and coats the particles of powdered sugar and other ingredients and is thereby dispersed completely throughout the admixture so that it no longer is visibly distinguishable. After the premix and sugar have been blended, the pregelatinized vegetable starch or guar gum is added and then thoroughly blended into the formulation. After blending, a final finishing or smoothing operation is effected in a hammer mill such as a commercial Fitz mill to reduce the particle size by impact and screening and result in a fine, uniform powdered product.

By adding the solidifying agent to the blended mixture of shortening and sugars, it has been found that the tendency of the shortening to coat the particles of solidifying agent and thus to reduce the valuable water-absorption capability of these particles can be avoided; the efficiency of the composition is thereby greatly enhanced, minimizing the amount of solidifying agent required. By so doing, the flavor and color of the composition can be optimized with a minimum change from conventional fudge formulations.

After the compositions have been finished and smoothed, they are measured and dispensed from hoppers into suitable packages for sale to an ultimate consumer. The packages may vary in size so that the ultimate amount of water required for admixture with the powder formulation may also vary. Generally, the amount of water added will range from about 15.0 to about 25.0 percent by weight of the dry powder formulation. Thus, for example, a standard 10.5 ounce or 298 gram package of the dry formulation will normally require the addition of about 48 grams of water or 3 tablespoons. In addition, it is generally desirable to add about 1 tablespoon or 14 grams of butter or margarine to provide added richness and optimum smooth, creamy consistency. If necessary, additional small quantities of water may be added to improve the spreadability of the moistened formulation, generally up to about 16 grams or about 3 teaspoons. The resultant moistened formulation, which may contain the added butter or margarine, is then mixed thoroughly and spread out into a layer in a low, flat pan wherein it is allowed to solidify, preferably under refrigeration, for a relatively brief period on the order of about thirty minutes. At the end of the period of solidification, it will be seen that an instant fudge-type candy is obtained without any cooking or messiness whatsoever.

The amount of water added is quite critical to obtaining the proper product since heat is not employed to drive off any excess water. When amounts less than about 15.0 percent by weight of the formulation are employed, the resultant moistened mixture exhibits inadequate spreading characteristics and amounts in excess of 25.0 percent provide a more liquid mixture resembling cake icing or cake batter which may be very easily spread or poured but which cannot be solidified by the action of the solidifying agent to the desired stage of consistency of conventional cooked fudge.

Although the action of the solidifying agent is not fully understood, it is believed that the solidifying agent absorbs or adsorbs the added water during the process of solidification so that the moisture which was so important to obtaining the desired spreadability is effectively tied up. Nevertheless, the composition continues to exhibit a desirable consistency over extended periods of time, and the fudge-type candy may be easily cut along any desired plane or easily broken by the fingers or the teeth and exhibits no noticeable sagging or creep along such cut faces. The fudge-type candy of this invention retains its attractive shape, texture and palatable flavor for a long period of time without drying out or becoming stiff or brittle, particularly if kept covered, again apparently because of the affinity of the solidifying agent for water and the interaction of the moistened solidifying agent with the other ingredients and the added water.

While the objects of the invention are efficiently achieved by the preferred forms of the invention described in the foregoing specification, the invention also includes changes and variations falling within and between the definitions of the following claims.

What is claimed is:
1. In the method of making a dry powder formulation for a self-solidifying instant fudge-type candy avoiding any requirement for heating above room temperature, the steps comprising: mixing together powdered sugar, finely divided shortening and flavoring ingredients to thoroughly disperse said shortening throughout the mixture; adding to said admixture about 1.5 to 10.0 percent by weight, based upon the total, of a solidifying agent selected from the group consisting of guar gum, pregelatinized vegetable starches and mixtures thereof; and thoroughly blending said solidifying agent with said admixture to produce a dry powder product.

2. The method of claim 1 wherein said solidifying agent is pregelatinized tapioca starch in the amount of about 4.0 to 8.0 percent by weight of said mixture.

3. The method of claim 1 wherein the principal flavoring ingredient is powdered cocoa and the solidifying agent is pregelatinized tapioca starch in the amount of about 4.5 to 6.5 percent by weight of said mixture.

4. The method of claim 1 wherein the principal flavoring ingredient is a non-chocolate flavoring and the solidifying agent is pregelatinized tapioca starch in the amount of about 5.5 to 7.5 percent by weight of said mixture.

5. The method of claim 1 wherein the solidifying agent is guar gum in the amount of about 2.0 to 3.5 percent by weight of said mixture.

6. The method of claim 1 wherein said powdered sugar is present in the amount of about 70.0 to 85.0 percent by weight, said finely divided shortening is present in the amount of 1.0 to 15.0 percent by weight, said flavoring ingredient is present in the amount of 0.2 to 15.0 percent by weight, and said solidifying agent is present in the amount of 1.5 to 10.0 percent by weight.

7. In the method of making a dry powder formulation for a self-solidifying instant fudge-type candy avoiding any requirement for heating above room temperature, the steps comprising: mixing together powdered sugar, finely divided shortening, flavoring ingredients and a solidifying agent selected from the group consisting of guar gum, edible pregelatinized vegetable starches and mixtures thereof, said solidifying agent comprising about 1.5 to 10.0 percent by weight of the mixture, and said mixture having a dry powder consistency; the powdered sugar, finely divided shortening and flavoring ingredients being initially mixed together, and said solidifying agent being thereafter added thereto and mixed therewith; adding water to said mixture in the amount of about 15.0 to 25.0 percent by weight thereof and blending said moistened mixture to produce a smooth, creamy consistency; spreading said blended mixture onto a support surface; and allowing said spread mixture to solidify to a fudge-type candy.

References Cited
UNITED STATES PATENTS

| | | | |
|---|---|---|---|
| 2,487,931 | 11/1949 | Lataner | 99—134 |
| 3,332,785 | 7/1967 | Kuchinke et al. | 99—139 |
| 2,651,574 | 9/1953 | Whittier | 99—134 |
| 3,343,965 | 9/1967 | Gass | 99—92 |

FOREIGN PATENTS

| | | |
|---|---|---|
| 538,664 | 8/1941 | Great Britain. |

OTHER REFERENCES

Bennett, H, Substitutes, N.Y., Chemical Publishing Co., Inc., 1943, p. 188.

Whistler, Royl. & BeMiller, J. N., Industrial Gums, N.Y., Academic Press, 1959, p. 328.

A. LOUIS MONACELL, Primary Examiner

W. C. LAWTON, Assistant Examiner

U.S. Cl. X.R.

99—139